(12) United States Patent
Ho

(10) Patent No.: US 9,610,993 B1
(45) Date of Patent: Apr. 4, 2017

(54) BICYCLE STAND

(71) Applicant: YE CHOU INDUSTRY CO., LTD., Chang Hua (TW)

(72) Inventor: Jern-Shorg Ho, Chang Hua (TW)

(73) Assignee: Ye Chou Industry Co., Ltd., Chang Hua (TW)

( * ) Notice: Subject to any disclaimer, the term of this patent is extended or adjusted under 35 U.S.C. 154(b) by 0 days.

(21) Appl. No.: 15/158,693

(22) Filed: May 19, 2016

(51) Int. Cl.
A47F 7/00 (2006.01)
B62H 3/08 (2006.01)
B62H 3/00 (2006.01)

(52) U.S. Cl.
CPC ........ *B62H 3/08* (2013.01); *B62H 3/00* (2013.01)

(58) Field of Classification Search
CPC .................................. B62H 3/08; B62H 3/00
USPC .......... 211/17–24; 224/924, 536, 42.19, 323, 224/42.38, 570
See application file for complete search history.

(56) References Cited

U.S. PATENT DOCUMENTS

| 511,367 | A | * | 12/1893 | Slater | B62H 3/00 211/20 |
|---|---|---|---|---|---|
| 516,571 | A | * | 3/1894 | Moulton | B62H 3/04 211/21 |
| 529,939 | A | * | 11/1894 | Noderer | B62H 3/08 211/20 |
| 556,758 | A | * | 3/1896 | Lefebre | B62H 3/00 211/198 |
| 556,806 | A | * | 3/1896 | Chandler | B62H 3/08 211/20 |
| 576,351 | A | * | 2/1897 | Penfield | B62H 3/08 211/20 |
| 589,643 | A | * | 9/1897 | De Mers | B62H 3/00 211/20 |
| 595,891 | A | * | 12/1897 | Robertson | B62H 3/08 211/20 |
| 611,856 | A | * | 10/1898 | Brown | B62H 3/08 211/17 |
| 612,663 | A | * | 10/1898 | Haubs | B62H 3/08 211/20 |
| 803,196 | A | * | 10/1905 | Shearman | B62H 3/08 211/20 |
| 1,202,444 | A | * | 10/1916 | Soleau | B62H 3/00 211/182 |
| 1,576,048 | A | * | 3/1926 | Hoffman | B62H 3/00 211/20 |

(Continued)

*Primary Examiner* — Joshua J Michener
*Assistant Examiner* — Devin Barnett
(74) *Attorney, Agent, or Firm* — Alan D. Kamrath; Kamrath IP Lawfirm, P.A.

(57) ABSTRACT

A bicycle stand includes a base, a front positioning rack and a rear positioning rack. The front positioning rack includes two uprights pivotally mounted on the base, a tensile spring biased on one of the two uprights, and an abutting member pivotally mounted between the two uprights to define a first placement zone between the abutting member and the two uprights. The rear positioning rack defines a second placement zone. Thus, the first placement zone, the second placement zone and the abutting member form a three-point support to hold a bicycle wheel. In addition, the angle between the first placement zone and the second placement zone can be adjusted in a determined range, so that the front positioning rack and the rear positioning rack are used to support bicycle wheels of different sizes.

5 Claims, 8 Drawing Sheets

(56) References Cited

U.S. PATENT DOCUMENTS

| | | | | |
|---|---|---|---|---|
| 3,116,836 A * | 1/1964 | McCauley | B62H 3/08 211/21 |
| 3,430,983 A * | 3/1969 | Jones | B60P 3/07 280/292 |
| 3,542,157 A * | 11/1970 | Noah | B60T 3/00 188/32 |
| 3,785,517 A * | 1/1974 | Brajkovich | B62H 3/08 211/22 |
| 4,629,104 A * | 12/1986 | Jacquet | B60R 9/10 211/17 |
| 4,802,594 A * | 2/1989 | Graber | B62H 3/00 211/20 |
| 4,852,779 A * | 8/1989 | Berg | B25H 1/0014 211/21 |
| 5,301,817 A * | 4/1994 | Merritt | A47F 7/04 211/20 |
| 5,462,398 A * | 10/1995 | Hymer | B60P 3/07 414/462 |
| 5,498,015 A * | 3/1996 | Trout | B62H 3/00 211/22 |
| D372,691 S * | 8/1996 | Eason | D12/115 |
| 5,692,659 A * | 12/1997 | Reeves | B60R 9/10 224/504 |
| 5,775,560 A * | 7/1998 | Zahn | B60R 9/06 224/485 |
| 5,988,402 A * | 11/1999 | Mayfield | B62H 3/04 211/20 |
| 5,988,403 A * | 11/1999 | Robideau | A47F 7/00 211/17 |
| 6,062,396 A * | 5/2000 | Eason | A47F 7/04 211/20 |
| 6,129,371 A * | 10/2000 | Powell | B60R 9/06 224/502 |
| 6,173,976 B1 * | 1/2001 | Lee | B62K 3/002 280/87.041 |
| 6,241,104 B1 * | 6/2001 | Kraus | B62H 3/04 211/20 |
| 6,296,162 B1 * | 10/2001 | Englander | B60R 9/048 224/323 |
| 6,332,621 B1 * | 12/2001 | Wu | B62K 3/002 16/900 |
| 6,488,157 B2 * | 12/2002 | Chen | B62H 3/00 211/20 |
| 6,575,310 B2 * | 6/2003 | Chamoun | B66F 3/08 211/17 |
| 6,588,603 B1 * | 7/2003 | West | B62H 3/04 211/19 |
| 6,640,979 B1 * | 11/2003 | Mayfield | B62H 3/00 211/20 |
| 6,644,672 B2 * | 11/2003 | Desjardins | B62K 3/002 280/14.25 |
| 6,755,309 B1 * | 6/2004 | Runge | B62H 3/04 211/183 |
| 7,150,359 B1 * | 12/2006 | Lyons | B62H 3/08 211/20 |
| D605,092 S * | 12/2009 | Van Buuren | D12/115 |
| 7,815,083 B2 * | 10/2010 | Clausen | B60R 9/06 224/497 |
| 7,958,973 B2 * | 6/2011 | Swasand | B60T 3/00 188/32 |
| 8,104,588 B2 * | 1/2012 | Curlee | B62H 3/04 188/32 |
| 8,166,695 B2 * | 5/2012 | Pippin | F41A 23/06 224/519 |
| 8,360,252 B1 * | 1/2013 | Fagan | B62H 3/00 211/21 |
| 8,496,148 B2 * | 7/2013 | Farney | B60R 9/06 224/497 |
| 8,851,301 B1 * | 10/2014 | Ho | B62H 3/04 211/20 |
| 9,022,265 B2 * | 5/2015 | Wolfe | B60R 9/10 224/403 |
| 9,145,180 B2 * | 9/2015 | Weeks | B62H 3/08 |
| 9,199,511 B2 * | 12/2015 | Hodges | B60B 30/00 |
| 9,254,791 B2 * | 2/2016 | Wolfe | B60R 9/06 |
| 9,358,933 B2 * | 6/2016 | Phillips | B60R 9/10 |
| 2002/0060436 A1 * | 5/2002 | Spiers | B62B 13/04 280/14.28 |
| 2002/0145264 A1 * | 10/2002 | Hung | B62K 15/006 280/87.041 |
| 2003/0071097 A1 * | 4/2003 | Dean | B60R 9/048 224/319 |
| 2006/0144804 A1 * | 7/2006 | Chiu | A63B 69/16 211/20 |
| 2006/0186161 A1 * | 8/2006 | Huang | B60R 9/06 224/497 |
| 2007/0164065 A1 * | 7/2007 | Davis | B60R 9/10 224/324 |
| 2010/0122958 A1 * | 5/2010 | Tsai | B62H 3/04 211/22 |
| 2011/0220594 A1 * | 9/2011 | Chuang | B62H 3/00 211/22 |
| 2012/0018969 A1 * | 1/2012 | Cho | B62K 3/002 280/87.041 |
| 2012/0241392 A1 * | 9/2012 | Combs | B60B 29/001 211/21 |
| 2013/0270201 A1 * | 10/2013 | Vineyard | B62H 3/06 211/21 |
| 2015/0175184 A1 * | 6/2015 | Yadan | B62K 5/05 280/35 |

* cited by examiner

US 9,610,993 B1

BICYCLE STAND

BACKGROUND OF THE INVENTION

1. Field of the Invention

The present invention relates to a stand and, more particularly, to a stand for parking a bicycle.

2. Description of the Related Art

A conventional bicycle stand 10 in accordance with the prior art shown in FIG. 8 comprises a hollow base 11, a pivot portion 13 and a hollow support seat 12. The hollow base 11 and the hollow support seat 12 are used to support a bicycle wheel. However, the bicycle wheel only straddles between the hollow base 11 and the hollow support seat 12 without any restriction so that the bicycle wheel is not positioned exactly and will be detached from the hollow support seat 12 due to hit. In addition, the hollow support seat 12 has fixed width and height so that the hollow support seat 12 is only available for a bicycle wheel with a fixed size and cannot fit bicycle wheels of different sizes, thereby limiting the versatility of the conventional bicycle stand 10.

BRIEF SUMMARY OF THE INVENTION

In accordance with the present invention, there is provided a bicycle stand comprising a base, a front positioning rack mounted on the base, and a rear positioning rack mounted on the base. The base is provided with two transverse support sections and two brackets. Each of the two brackets is provided with an arcuate slot. The arcuate slot of each of the two brackets has a first side provided with a first guide hole and a second side provided with a second guide hole having a dimension smaller than that of the first guide hole. The front positioning rack includes two uprights pivotally mounted on the two brackets respectively, a tensile spring mounted between the two brackets and biased on one of the two uprights, and an abutting member pivotally mounted between upper ends of the two uprights to define a first placement zone between the abutting member and the two uprights for supporting a front portion of a bicycle wheel. Each of the two uprights of the front positioning rack has a lower end provided with a through hole pivotally connected with the arcuate slot of each of the two brackets by a movable pulling module and a positioning bolt. The movable pulling module and the positioning bolt are slidable in the arcuate slot of each of the two brackets. The rear positioning rack includes two upright pieces mounted on the base and a rotary frame pivotally mounted between the two pieces and defining a second placement zone for supporting a rear portion of the bicycle wheel.

According to the primary advantage of the present invention, the first placement zone of the front positioning rack, the second placement zone of the rear positioning rack and the abutting member of the front positioning rack form a three-point support to hold the bicycle wheel, so that the bicycle wheel is supported solidly and stably without producing vibration or deflection.

According to another advantage of the present invention, the angle between the first placement zone of the front positioning rack and the second placement zone of the rear positioning rack can be adjusted in a determined range, so that the front positioning rack and the rear positioning rack are used to support bicycle wheels of different sizes, thereby enhancing the versatility of the bicycle stand.

According to a further advantage of the present invention, the bicycle stand is folded to reduce its volume when not in use so that the bicycle stand is carried easily and conveniently and will not occupy space.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
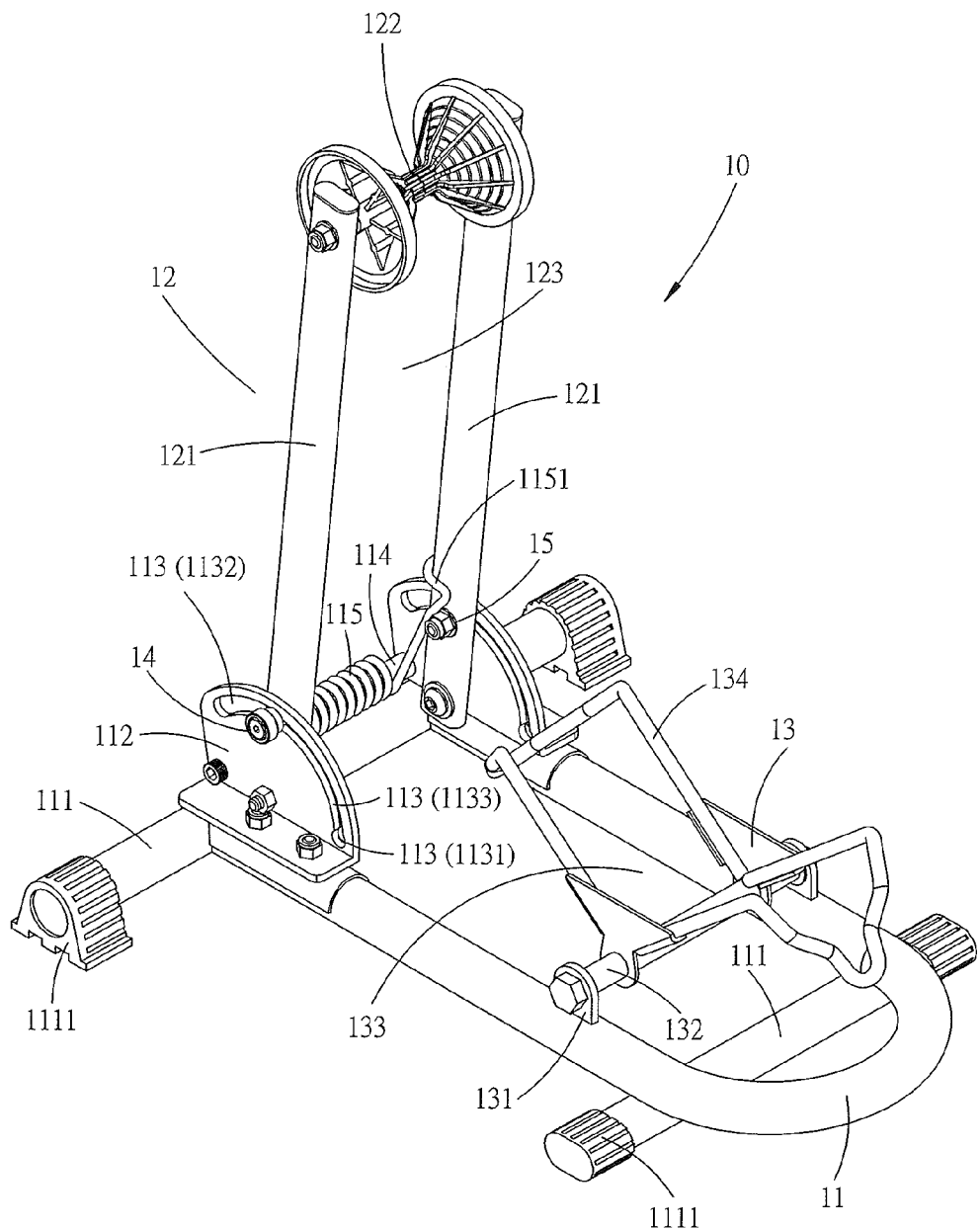
FIG. 1 is a perspective view of a bicycle stand in accordance with the present invention.
Figure 2:
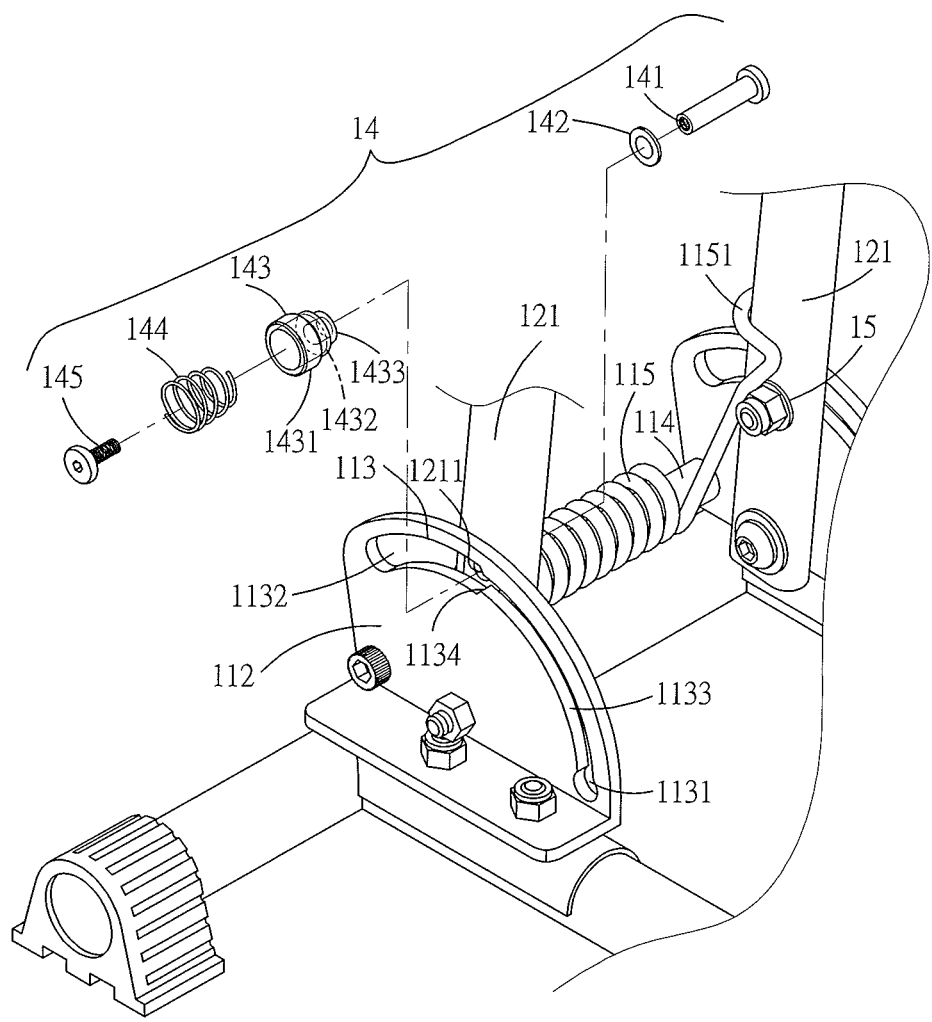
FIG. 2 is an exploded perspective view of the bicycle stand in accordance with the present invention.
Figure 3:
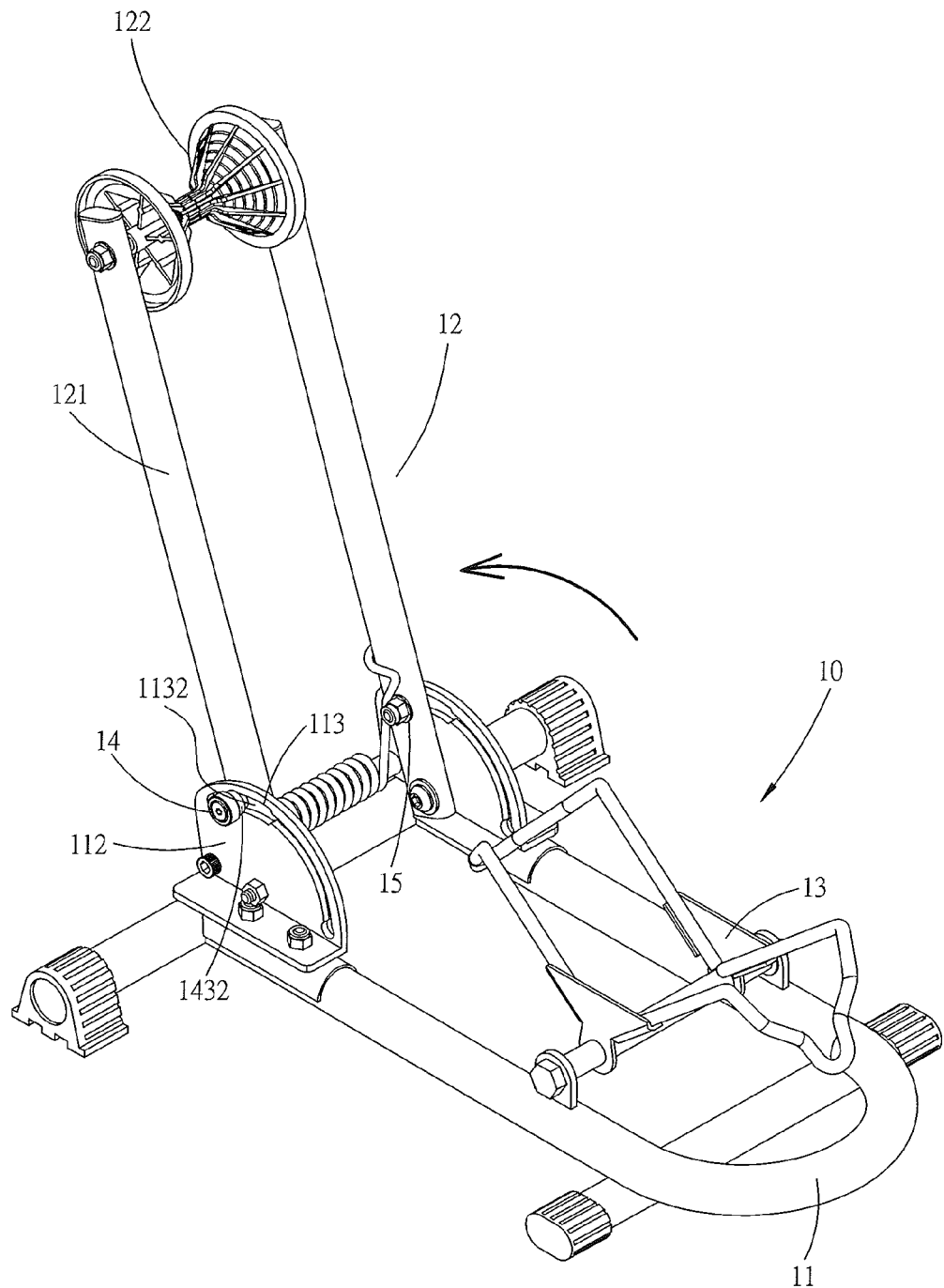
FIG. 3 is a perspective operational view of the bicycle stand in accordance with the present invention.

Referring to the drawings and initially to FIGS. 1-3, a bicycle stand 10 in accordance with the preferred embodiment of the present invention comprises a base 11, a front positioning rack 12 mounted on the base 11, and a rear positioning rack 13 mounted on the base 11.

The base 11 has a substantially U-shaped profile and is disposed at a flat state. The base 11 is provided with two transverse support sections 111 and two brackets 112. Each of the two brackets 112 is provided with an arcuate slot 113. Each of the two support sections 111 has two opposite ends each provided with an antiskid pad 1111. Preferably, the two support sections 111 have different length.

The arcuate slot 113 of each of the two brackets 112 has a first side provided with a first guide hole 1132 and a second side provided with a second guide hole 1133 having a dimension smaller than that of the first guide hole 1132. The second guide hole 1133 of each of the two brackets 112 has a first end provided with a stop edge 1134 located between the second guide hole 1133 and the first guide hole 1132 and a second end provided with a stop recess 1131.

The front positioning rack 12 includes two uprights 121 pivotally mounted on the two brackets 112 respectively, a tensile spring 115 mounted between the two brackets 112 and biased on one of the two uprights 121, and an abutting member 122 pivotally mounted between upper ends of the two uprights 121 to define a first placement zone 123 between the abutting member 122 and the two uprights 121 for supporting a front portion of a bicycle wheel.

Each of the two uprights 121 of the front positioning rack 12 has a lower end provided with a through hole 1211 pivotally connected with the arcuate slot 113 of each of the two brackets 112 by a movable pulling module 14 and a positioning bolt 15. The movable pulling module 14 and the positioning bolt 15 are slidable in the arcuate slot 113 of each of the two brackets 112. Preferably, the movable pulling module 14 and the positioning bolt 15 are slidable in the first guide hole 1132 of each of the two brackets 112 and are stopped by the stop edge 1134 of the second guide hole 1133 of each of the two brackets 112. Preferably, the movable pulling module 14 and the positioning bolt 15 are slidable in the second guide hole 1133 of each of the two brackets 112 and are stopped by the stop recess 1131 of the second guide hole 1133 of each of the two brackets 112.

The rear positioning rack 13 includes two upright pieces 131 mounted on the base 11 and a rotary frame 134 pivotally mounted between the two pieces 131 and defining a second placement zone 133 for supporting a rear portion of the bicycle wheel. The rotary frame 134 of the rear positioning rack 13 has a substantially L-shaped profile. Preferably, the rear positioning rack 13 further includes a support rod 132 mounted between the two pieces 131, and the rotary frame 134 of the rear positioning rack 13 is pivotally mounted on the support rod 132.

In the preferred embodiment of the present invention, the front positioning rack 12 further includes a fixed rod 114 transversely mounted between the two brackets 112, and the tensile spring 115 is mounted on the fixed rod 114 and has a first end provided with a leg 1151 locked onto one of the two uprights 121 and a second end secured on the fixed rod 114 or one of the two support sections 111.

In the preferred embodiment of the present invention, the movable pulling module 14 includes a hollow control knob 143 movably mounted in the arcuate slot 113 of each of the two brackets 112, a spring 144 mounted in the control knob 143, a threaded tube 141 extending through a washer 142, the through hole 1211 of each of the two uprights 121 of the front positioning rack 12, the arcuate slot 113 of each of the two brackets 112, the control knob 143 and the spring 144, and a threaded rod 145 screwed into the threaded tube 141 and abutting the control knob 143. The control knob 143 of the movable pulling module 14 has a first portion provided with a first annular section 1431 having a dimension greater than that of the first guide hole 1132 and the second guide hole 1133 of each of the two brackets 112, a mediate portion provided with a second annular section 1432 having a dimension smaller than that of the first guide hole 1132 of each of the two brackets 112 and greater than that of the second guide hole 1133 of each of the two brackets 112, and a second portion provided with a third annular section 1433 having a dimension smaller than that of the first guide hole 1132 and the second guide hole 1133 of each of the two brackets 112.

The first annular section 1431 of the control knob 143 of the movable pulling module 14 abuts a peripheral wall of the arcuate slot 113 of each of the two brackets 112, the second annular section 1432 of the control knob 143 of the movable pulling module 14 is slidable in the first guide hole 1132 of each of the two brackets 112 and is stopped by the stop edge 1134 of each of the two brackets 112, and the third annular section 1433 of the control knob 143 of the movable pulling module 14 is slidable in the second guide hole 1133 of each of the two brackets 112 and is stopped by the stop recess 1131 of each of the two brackets 112.

Figure 4:
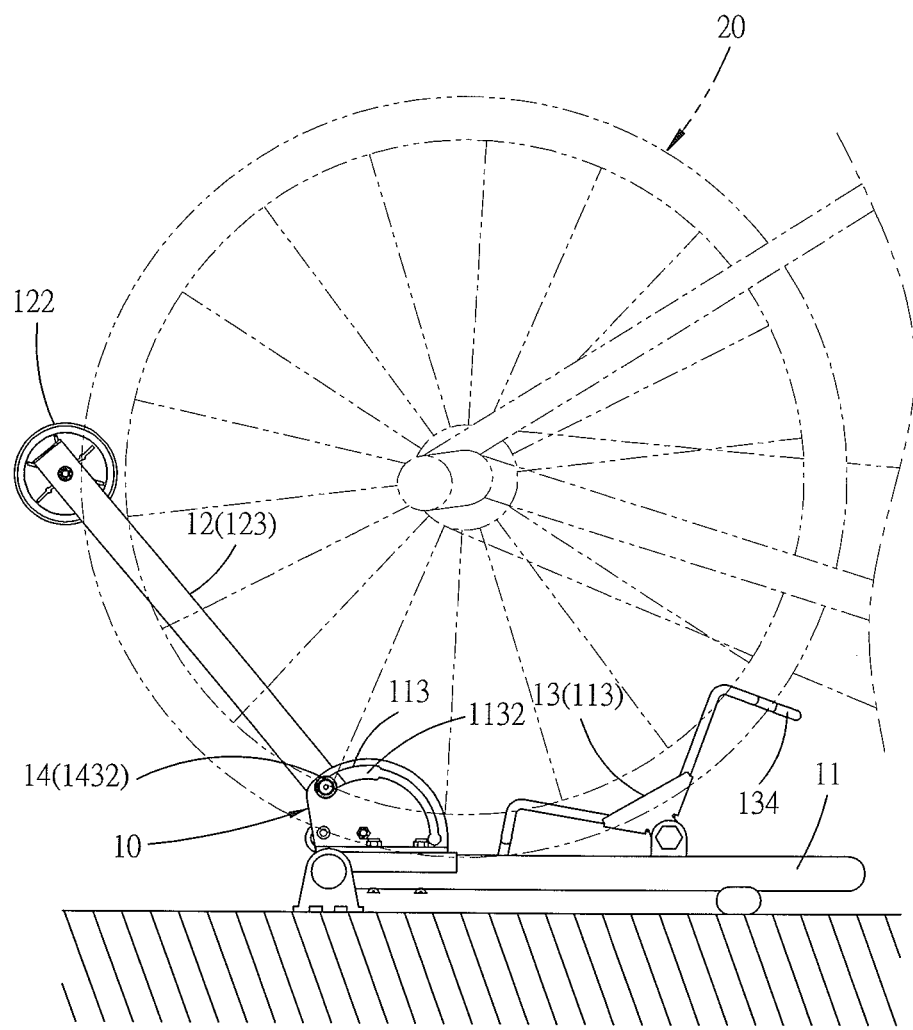
FIG. 4 is a side view of the bicycle stand for parking a bicycle wheel in accordance with the preferred embodiment of the present invention.
Figure 5:
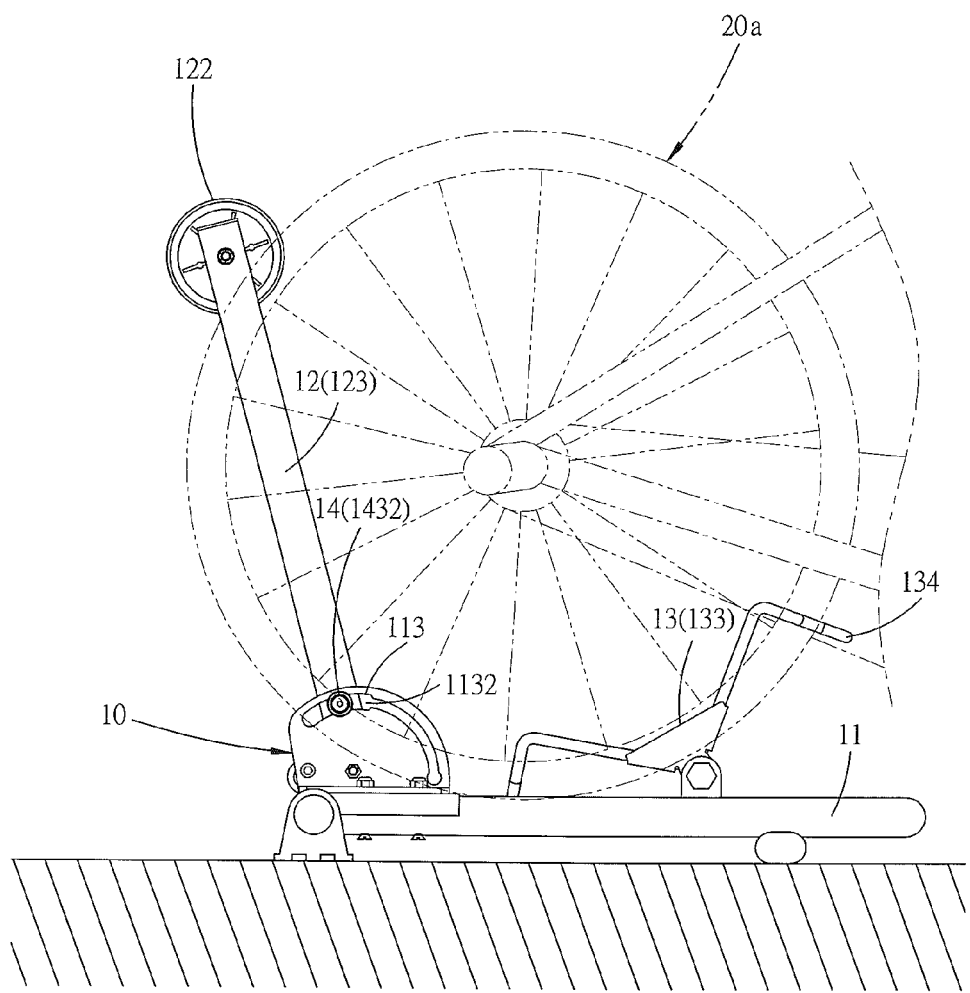
FIG. 5 is a side view of the bicycle stand for parking a bicycle wheel in accordance with another preferred embodiment of the present invention.

In operation, referring to FIGS. 3-5 with reference to FIGS. 1 and 2, an angle is defined between the first placement zone 123 of the front positioning rack 12 and the second placement zone 133 of the rear positioning rack 13, so that the first placement zone 123 of the front positioning rack 12 and the second placement zone 133 of the rear positioning rack 13 are used to support a bicycle wheel 20 as shown in FIG. 4 or a bicycle wheel 20a as shown in FIG. 5. The bicycle wheel 20 and the bicycle wheel 20a have different sizes. When the bicycle wheel 20 or 20a applies a force on the front positioning rack 12, the front positioning rack 12 is pivoted forward as shown in FIG. 3, to compress the spring 144 so that the spring 144 stores a restoring force. At this time, the second annular section 1432 of the control knob 143 of the movable pulling module 14 is slidable in the first guide hole 1132 of each of the two brackets 112, to guide movement of the two uprights 121 of the front positioning rack 12, so that the front positioning rack 12 is moved in a determined angular range. In such a manner, the first placement zone 123 of the front positioning rack 12, the second placement zone 133 of the rear positioning rack 13 and the abutting member 122 of the front positioning rack 12 form a three-point support to hold and restrict the bicycle wheel 20 or 20a solidly and stably, thereby preventing the bicycle wheel 20 or 20a from being vibrated leftward and rightward. In addition, the front positioning rack 12 and the rear positioning rack 13 are used to support the bicycle wheel 20 or 20a of different sizes. When the force applied on the front positioning rack 12 disappears, the front positioning rack 12 is pivoted backward by the restoring force of the spring 144 so that the front positioning rack 12 is moved to the original position as shown in FIG. 1. At this time, the second annular section 1432 of the control knob 143 of the movable pulling module 14 is stopped by the stop edge 1134 of each of the two brackets 112.

Figure 6:
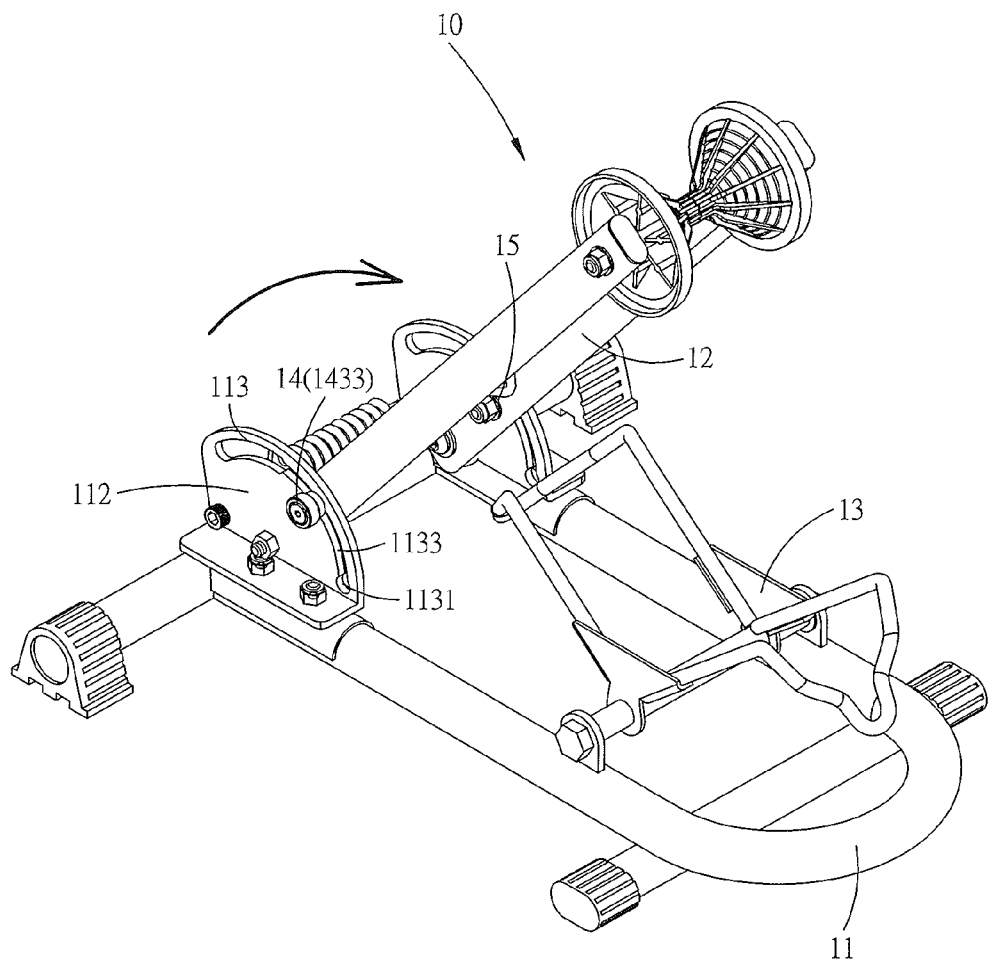
FIG. 6 is a perspective folding operational view of the bicycle stand in accordance with the present invention.
Figure 7:
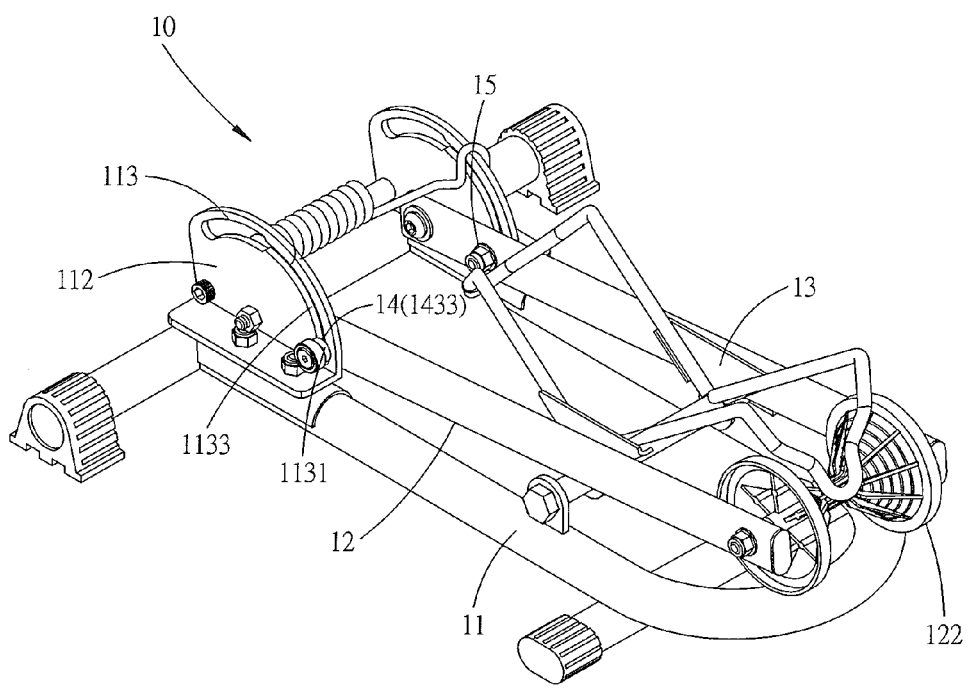
FIG. 7 is a perspective folded view of the bicycle stand in accordance with the present invention.
Figure 8:
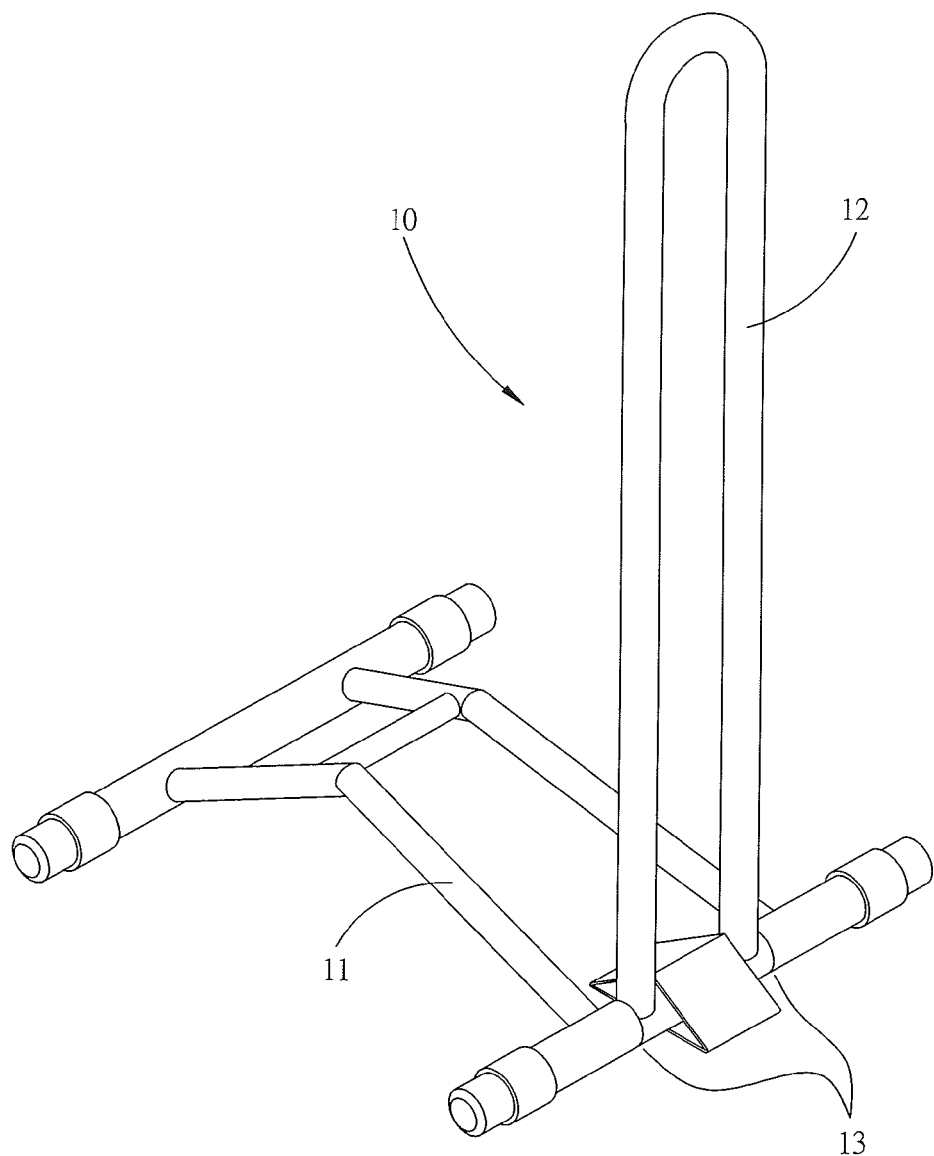
FIG. 8 is a perspective view of a conventional bicycle stand in accordance with the prior art.

In folding of the bicycle stand 10, referring to FIGS. 6 and 7 with reference to FIGS. 1 and 2, when the first annular section 1431 of the control knob 143 of the movable pulling module 14 is pulled outward, the second annular section 1432 of the control knob 143 of the movable pulling module 14 is detached from the first guide hole 1132 of each of the two brackets 112, and the third annular section 1433 of the control knob 143 of the movable pulling module 14 extends into the first guide hole 1132 of each of the two brackets 112 and is slidable in the second guide hole 1133 of each of the two brackets 112. In such a manner, when the front positioning rack 12 is pivoted backward toward the rear positioning rack 13 as shown in FIG. 6, the third annular section 1433 of the control knob 143 of the movable pulling module 14 passes through the stop edge 1134 into the second guide hole 1133 of each of the two brackets 112 and is moved in the second guide hole 1133 of each of the two brackets 112 to guide movement of the front positioning rack 12. The front positioning rack 12 is further pivoted backward to abut the rear positioning rack 13 as shown in FIG. 7, so as to fold the bicycle stand 10 completely. At this time, the third annular section 1433 of the control knob 143 of the movable pulling module 14 is stopped by the stop recess 1131 of each of the two brackets 112. Thus, the bicycle stand 10 is folded completely to have a reduced volume when not in use so that the bicycle stand 10 is carried conveniently and will not occupy space.

Accordingly, the first placement zone 123 of the front positioning rack 12, the second placement zone 133 of the rear positioning rack 13 and the abutting member 122 of the front positioning rack 12 form a three-point support to hold the bicycle wheel 20 or 20a, so that the bicycle wheel 20 or 20a is supported solidly and stably without producing vibration or deflection. In addition, the angle between the first placement zone 123 of the front positioning rack 12 and the second placement zone 133 of the rear positioning rack 13 can be adjusted in a determined range, so that the front positioning rack 12 and the rear positioning rack 13 are used to support bicycle wheels of different sizes, thereby enhancing the versatility of the bicycle stand 10. Further, the bicycle stand 10 is folded to reduce its volume when not in use so that the bicycle stand 10 is carried easily and conveniently and will not occupy space.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. An adjustable bicycle stand comprising: a base;
a front positioning rack mounted on the base; and a rear positioning rack mounted on the base; wherein:
the base is provided with two transverse support sections and two brackets;
each of the two brackets is provided with an arcuate slot; the arcuate slot of each of the two brackets has a first side provided with a first guide hole and a second side provided with a second guide hole having a dimension smaller than that of the first guide hole;
the front positioning rack includes two uprights pivotally mounted on the two brackets respectively, a tensile spring mounted between the two brackets and biased on one of the two uprights, and an abutting member rotatably mounted between upper ends of the two uprights to define a first placement zone between the abutting member and the two uprights for supporting a front portion of a bicycle wheel, wherein the abutting member comprises two cones facing opposite one another and joined together so that the abutting member is suitable for supporting various wheel widths and sizes;
each of the two uprights of the front positioning rack has a lower end provided with a through hole pivotally connected with the arcuate slot of each of the two brackets by a movable pulling module and a positioning bolt;
the movable pulling module and the positioning bolt are slidable in the arcuate slot of each of the two brackets; and
the rear positioning rack includes two upright pieces mounted on the base and a substantially L-shaped rotary frame pivotally mounted between the two pieces and defining a second placement zone for supporting a rear portion of the bicycle wheel;
wherein, when in use, a bicycle wheel is rolled over the rotary frame of the rear positioning rack and a first end of the rotary frame is pivoted downward in a first direction that is clockwise or counter-clockwise so that the first end of the rotary frame moves closer to the base to receives a lower portion of the bicycle wheel and a second end of the rotary frame is pivoted upward in the first direction so that the second end of the rotary frame moves further away from the base to receive an upper portion of the bicycle wheel; and the bicycle wheel applies a force on the abutting member of the front positioning rack and the two uprights of the front positioning rack are pivoted forward so that the front positioning rack is moved in a determined angular range; wherein the first placement zone of the front positioning rack, the second placement zone of the rear positioning rack and the abutting member of the front positioning rack form a three-point support to hold and restrict the bicycle wheel solidly and stably, thereby preventing the bicycle wheel from being vibrated leftward and rightward;
when the bicycle wheel is rolled off the rear positioning rack, the first end and second end of the rotary frame are pivoted in a second direction opposite the first direction to their respective original orientations, the force applied on the front positioning rack by the bicycle wheel disappears, and the uprights of the front positioning rack are pivoted backward by the biasing of the tensile spring so that the front positioning rack is moved to an original rest position.

2. The bicycle stand of claim 1, wherein:
the base has a substantially U-shaped profile and is disposed at a flat state; and
each of the two support sections has two opposite ends each provided with an antiskid pad.

3. The bicycle stand of claim 1, wherein:
the second guide hole of each of the two brackets has a first end provided with a stop edge located between the second guide hole and the first guide hole and a second end provided with a stop recess;
the movable pulling module and the positioning bolt are slidable in the first guide hole of each of the two brackets and are stopped by the stop edge of the second guide hole of each of the two brackets;
the movable pulling module and the positioning bolt are slidable in the second guide hole of each of the two brackets and are stopped by the stop recess of the second guide hole of each of the two brackets.

4. The bicycle stand of claim 1, wherein:
the front positioning rack further includes a fixed rod transversely mounted between the two brackets; and
the tensile spring is mounted on the fixed rod and has a first end provided with a leg locked onto one of the two uprights and a second end secured on the fixed rod or one of the two support sections.

5. The bicycle stand of claim 4, wherein:
the movable pulling module includes a hollow control knob movably mounted in the arcuate slot of each of the two brackets, a spring mounted in the control knob, a threaded tube extending through a washer, the through hole of each of the two uprights of the front positioning rack, the arcuate slot of each of the two brackets, the control knob and the spring, and a threaded rod screwed into the threaded tube and abutting the control knob;
the control knob of the movable pulling module has a first portion provided with a first annular section having a dimension greater than that of the first guide hole and the second guide hole of each of the two brackets, a mediate portion provided with a second annular section having a dimension smaller than that of the first guide hole of each of the two brackets and greater than that of the second guide hole of each of the two brackets, and a second portion provided with a third annular section having a dimension smaller than that of the first guide hole and the second guide hole of each of the two brackets;
the first annular section of the control knob of the movable pulling module abuts a peripheral wall of the arcuate slot of each of the two brackets;
the second annular section of the control knob of the movable pulling module is slidable in the first guide hole of each of the two brackets and is stopped by the stop edge of each of the two brackets; and
the third annular section of the control knob of the movable pulling module is slidable in the second guide hole of each of the two brackets and is stopped by the stop recess of each of the two brackets.

* * * * *